Jan. 6, 1953     J. F. KANE     2,624,388
TRACTION CHAIN FASTENING DEVICE FOR DUAL VEHICLE WHEELS
Filed March 17, 1948
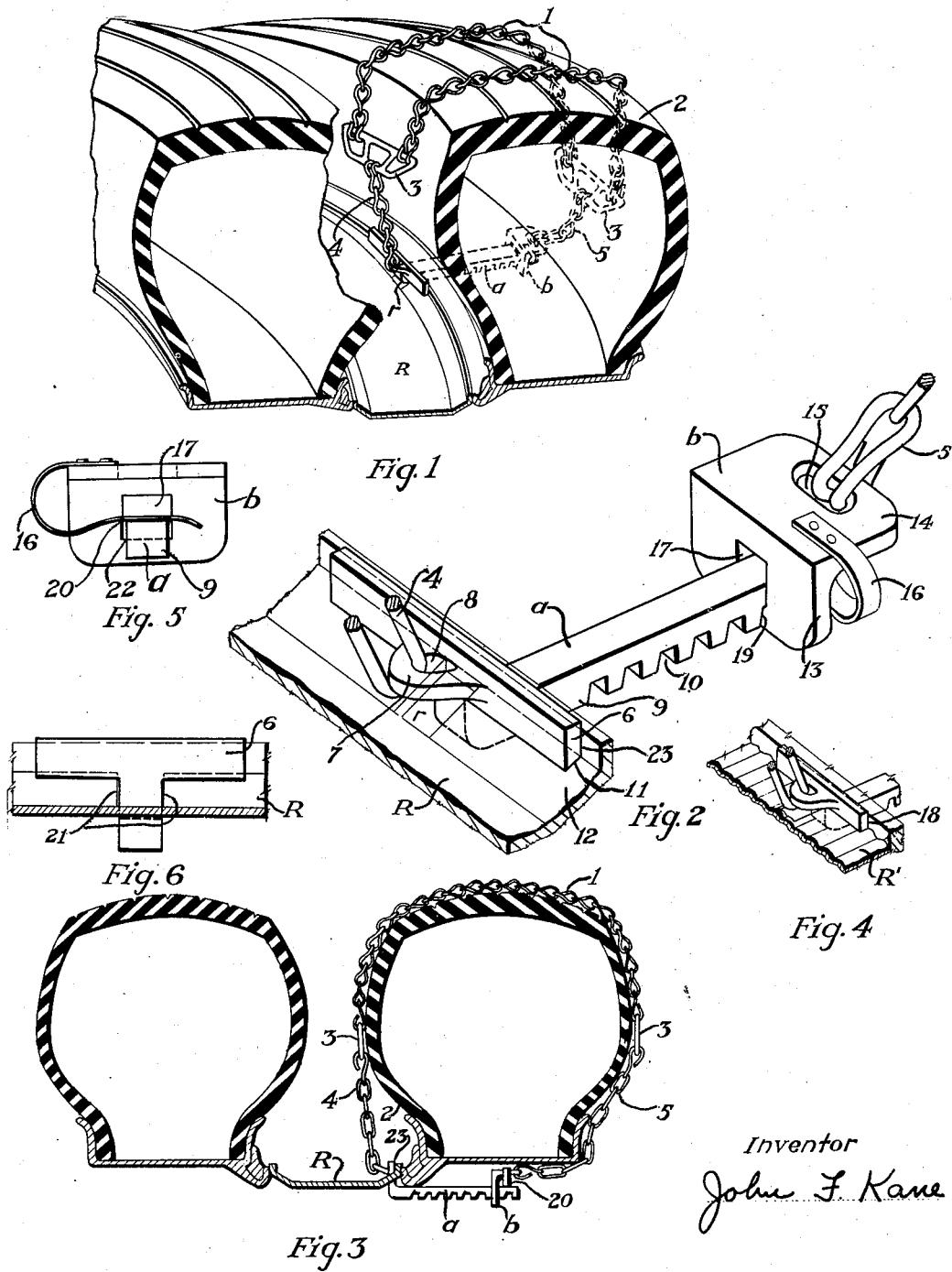
Inventor
John F. Kane Patented Jan. 6, 1953

2,624,388

UNITED STATES PATENT OFFICE 2,624,388

TRACTION CHAIN FASTENING DEVICE FOR DUAL VEHICLE WHEELS

John F. Kane, Fall River, Mass., assignor to Kane Chain Company, Incorporated, Fall River, Mass., a corporation of Massachusetts Application March 17, 1948, Serial No. 15,448

4 Claims. (Cl. 152—220)

My invention relates to the manner in fastening encircling traction cross chains to spoke dual vehicle wheels of a type in which the adjacent rims are maintained in a fixed relative position by means of an aligning ring, by making use of a locking arrangement which acts in conjunction with said aligning ring, the walls of radially spaced openings or recesses therein, and said wheel rim.

An important object of my invention is to provide a fastening device of a character that can be easily and quickly attached to the wheel, and when attached to maintain a secure engagement with the wheel structure, while yet allowing a slight creep in the traction cross chains back and forth along the tire, and which then can be easily and quickly removed, with the attaching and removing of the assembly being done without moving the wheel either along or off the ground.

Another object is to provide an adjustable means for fastening the ends of the assembly together, with the fastener in its position fixed to the wheel and so constructed that it can be easily secured to said wheel and adjusted to fit different size tires.

Further objects and advantages appearing as the description proceeds, the invention resides in the combination and arrangement of parts and in the details of construction hereinafter described and claimed, it being understood that various changes in form, proportion and details of construction may be resorted to without departing from the spirit, or sacrificing any advantage of the invention.

In the drawing:

Figure 1 is a perspective view, partly in cross section, of a spoke type dual vehicle wheel, tires and traction chain assembly shown in position encircling the outer wheel.

Figure 2 is an isometric view of the locking and receiving members of said assembly in engagement, showing the aligning ring opening.

Figure 3 is a cross sectional view through a spoke type dual vehicle wheel, showing said chain assembly encircling the outer wheel.

Figure 4 is an isometric view of part of said assembly acting in conjunction with a corrugated type aligning ring and the wheel rim.

Figure 5 is a front elevational view of member $b$ with member $a$ in engagement.

Figure 6 is a sectional view through the aligning ring showing the relative position of the sides of the elongated tongue of member $a$, with the side walls of the aligning ring opening.

The locking member as a unit will be denoted by the letter $a$.

The receiving member as a unit will be denoted by the letter $b$.

In Figure 2, R denotes a dual wheel aligning ring with opening $r$.

Referring to the drawing by numeral, numeral 1 refers to a pair of traction chains partly encircling a tire 2, the ends of which are connected to spacing frames 3, which hold said chains in position on the tire. Side chains 4 and 5 extend from said spacing frames on both sides of the wheel, the one on the inside of the outer wheel connecting to the locking member $a$, and the one on the outside connecting to receiving member $b$.

Locking member $a$ comprises a vertical member or leg 6 with an inclined outstanding ear 7 on one side, said ear having an aperture 8 for fastening to the side chain 4, while projecting from the bottom of said leg and extending in the opposite direction to said ear is an elongated tongue 9 having opposite rectilinear sides and a number of spaced indentations along its edge in the form of teeth 10. The surface of the bottom of said vertical member or leg on both sides of the projecting tongue member is sloped at 11 to conform with the slope of that part of the aligning ring 12 which it engages.

Receiving member $b$ consists of a vertical member or leg 13 and a horizontal leg 14 with an opening 15 in the horizontal leg for fastening to the side chain 5 and an attached flat spring 16, an opening 17 in the vertical leg through which the elongated tongue 9 of the locking member is inserted for the purpose of engaging and fastening the ends of the assembly together.

Describing the manner in which the assembly is attached to a dual spoke wheel, the end containing the locking member $a$ is placed in position on the inside of the tire and the elongated tongue 9 on said locking member is inserted through one of the aligning ring openings as disclosed in section in Figure 6. It is manually pulled into position from the outside with the front face of the vertical leg of said member bearing against the adjacent aligning ring R at 23, Figures 2 and 3 showing this leg bearing against the vertical flange of the aligning ring and with its bottom face bearing against the sloped surface of said aligning ring. In Figure 4, however, which shows the corrugated type aligning ring R', said leg is shown bearing directly against the side of the wheel rim 18, with its bottom face resting on said corrugated surface. The opposite rectilinear sides of said tongue adjacent said vertical leg engaging the walls of the aligning ring opening 21, Figure 6, upon the locking member being positioned, resulting in a lock radially and circumferentially being formed between this member and the dual wheel.

The end of the assembly containing the receiving member $b$ is placed in position around the front of the tire, with said member positioned under the rim, to engage the locking member.

The flat spring 16 fastened to the horizontal leg of the receiving member and extending horizontally below it is elevated manually against the lower face of said horizontal leg and the elongated tongue of the locking member is inserted through the opening 17 in the vertical leg of the receiving member. When the cross chains are snugly in position encircling the tire, the receiving member is lifted, resulting in the faces of the indentation of the elongated tongue in adjusted position engaging the walls of the vertical leg of said receiving member below the opening in said member as at 19, Figure 2, thus fastening the assembly together. Manual pressure on the flat spring is then released, causing it to assume a restraining position against the top of the elongated tongue of the locking member as at 20, Figure 5, thus preventing said tongue from slipping out of its fastening with said receiving member.

It will be noted that the stress transmitted from the traction chains 1, as they grip the road surface, through the side chains 4 and 5 to the fasteners of the assembly, tends to pull the receiving member outwardly, thus increasing the force which that member exerts on the top face of the indentation 22 in the locking member $a$ with which it is engaged and thereby providing a more secure fastening of the ends of the assembly.

The chain assembly can be removed by simply elevating the spring 16 to the underside of the horizontal leg of the receiving member $b$, lifting the elongated tongue so that the indentation 19 is disengaged from the receiving member $b$ and then pulling the receiving member outwardly. The elongated tongue being released from its engagement with the receiving member, can then be pushed inwardly releasing the engagement at 21 and 23 of the elongated tongue and vertical leg of the locking member with the dual wheel aligning ring and freeing the assembly.

I claim:

1. In combination with a traction chain assembly for a dual vehicle wheel of the spoke type, having an aligining ring between the wheel rims with openings therein, a locking member comprising an elongated indented tongue having opposite rectilinear sides engageable with the side walls of one of said openings upon insertion therein, having an element engaging the inner face of the aligning ring flange and connected to said chain assembly, a receiving member, comprising an angular element with attached spring fastened to said chain assembly and having an aperture for receiving said tongue and means for adjustably engaging said tongue with said receiving member and for retaining said members in engagement when the assembly is in adjusted position.

2. In a device of the character described, the combination with a tire and a spoke type dual wheel with an aligning ring, of a traction chain assembly comprising traction chains, a locking member with a leg positioned to bear against the flange and web of said aligning ring, an elongated tongue with opposite rectilinear sides shaped to engage laterally the walls of an opening in said aligning ring directly below said leg, a receiving member comprising elements angular to each other with an attached spring, said receiving member containing an aperture for the insertion of said tongue, and means for engaging said tongue at its coinciding indentation with said receiving member.

3. In combination with a traction chain assembly and a spoke type dual wheel having an aligning ring, a locking member comprising an elongated tongue with opposite rectilinear sides fitting snugly in an opening formed in said aligning ring, upon insertion therein, said elongated tongue having spaced indentations in the form of teeth, a projecting leg having an apertured outstanding ear for fastening to said chain assembly, with said leg positioned to bear laterally against the side of the aligning ring, a receiving member fastened to the other end of said chain assembly, comprising elements angular to each other and having an attached flat spring, said receiving member containing an aperture for the insertion of said tongue and means for engaging said tongue at its coinciding indentation with said receiving member.

4. In a traction chain fastening device for spoke dual vehicle wheels, having an aligning ring between the dual rims, the combination of a member having an elongated tongue with spaced indentations and opposite rectilinear sides, with sides shaped to snugly fit into an opening in said aligning ring upon insertion therein, and having means for engaging a surface of said aligning ring, an angular member with an attached flat spring, said angular member containing an aperture for the insertion of said tongue, and means for engaging said tongue at its coinciding indentation with said angular member and for tensioning said spring when the assembly is in adjusted position.

JOHN F. KANE.

REFERENCES CITED

The following references are of record in the file of this patent:

UNITED STATES PATENTS

| Number | Name | Date |
|---|---|---|
| 1,450,199 | Barber | Apr. 3, 1923 |
| 1,827,792 | Keller | Oct. 20, 1931 |
| 2,315,060 | Kane | Mar. 30, 1943 |